Oct. 26, 1926.
W. F. BYERLY
WELL STRAINER
Filed June 25, 1925
1,604,386
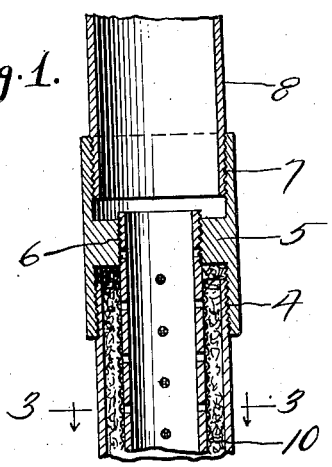
Fig. 1.
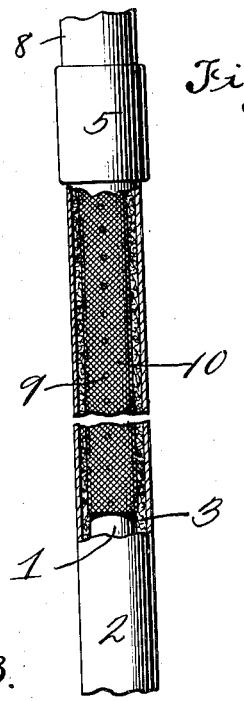
Fig. 2.
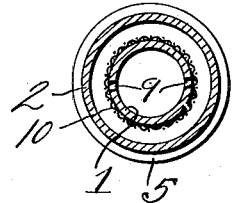
Fig. 3.
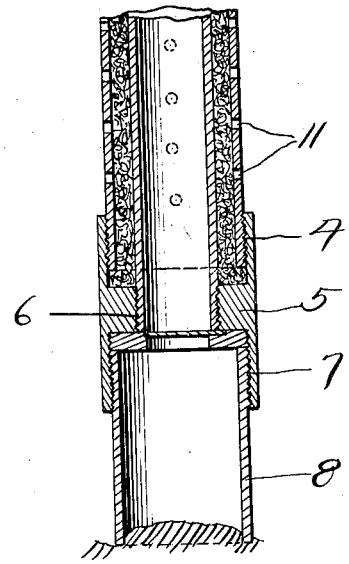
Inventor
W. F. Byerly
By
Attorney Patented Oct. 26, 1926.

1,604,386

UNITED STATES PATENT OFFICE.

WILLIAM FRED BYERLY, OF BEAUMONT, TEXAS

WELL STRAINER.

Application filed June 25, 1925. Serial No. 39,553.

The invention relates to well strainers, adapted for use in connection with oil and water wells, and has for its object to provide a device of this character comprising an inner casing having apertures adjacent its upper end, and an outer casing having apertures adjacent its lower end and straining material between the casings through which oil or water passes and is thoroughly strained and separated from foreign matter, such as sand or dirt before it enters the inner casing.

A further object is to provide a screen surrounding the perforated portion of the inner casing and forming additional means for insuring a proper straining of the water or oil. The straining material disposed between the casings may be of any kind desired.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a vertical sectional view through the strainer.

Figure 2 is a view in elevation of the strainer showing a portion of the outer strainer broken away for showing the wire mesh around the inner casing.

Figure 3 is a horizontal sectional view taken on line 3—3 of Figure 1.

Referring to the drawing, the numeral 1 designates the inner cylindrical casing of the strainer, and 2 the outer casing which surrounds the inner casing 1 in spaced relation thereto, thereby forming an annular chamber around the inner casing, in which is disposed straining material 3. The straining material is preferably formed from sponge, however it may be formed from hemp, jute, or fine gravel, and applicant does not limit himself as to the use of any particular straining material. Threaded on the upper and lower ends of the outer casing 2 at 4 are reducers 5, in the reduced portions 6 of which the ends of the inner casing 1 are threaded, therefore it will be seen that the casings 1 and 2 are rigidly supported and maintained in spaced relation to each other, at all times for forming the chamber for the straining material. Bushings 5 have threaded therein at 7 well casing sections 8, therefore it will be seen that the strainer may be connected to a conventional form of well casing.

The upper end of the inner casing 1 is provided with a plurality of apertures 9, and surrounding the upper end of the casing 1, and forming screens for all of the apertures 9 is a wire mesh member 10. Water enters the strainer through a plurality of apertures 11 in the lower end of the outer casing 2, and rises upwardly between the casing through the straining material 3, which straining material separates foreign matter, for instance, dirt and sand from the water or oil before it enters the inner casing 1 through the wire mesh 10 and apertures 9 in the inner casing, therefore it will be seen water or oil will be thoroughly strained and free of foreign matter before it enters the inner casing. By providing the wire mesh 10, any foreign matter which may pass through the straining material will be strained therefrom immediately before the fluid enters the inner casing.

From the above it will be seen that a well straining device is provided which may be easily and quickly applied to a casing or removed therefrom, and said straining device is provided with means which will thoroughly strain the fluid. It will also be seen that the device may be cheaply manufactured and sold, and the parts reduced to a minimum.

The invention having been set forth what is claimed as new and useful is:—

1. A well strainer comprising an outer casing, an inner casing within the outer casing and of smaller diameter, thereby forming a chamber around the inner casing, a straining material within said chamber, reducer bushings connecting the ends of the casings, the upper end of the inner casing being provided with a plurality of apertures, a mesh work extending around the upper end of the inner casing and covering the apertures therein, the lower end of the outer casing being provided with a plurality of apertures.

2. A well straining device comprising inner and outer casings, the opposite ends of said casings being perforated, a wire mesh screen extending around the perforated portion of the inner casing and straining material disposed within the outer casing and surrounding the inner casing.

In testimony whereof I have signed my name to this specification.

WILLIAM FRED BYERLY.